Aug. 11, 1959  W. T. WAGNER  2,898,975
CUSHIONING CONSTRUCTION
Filed Oct. 28, 1957
Fig. 1
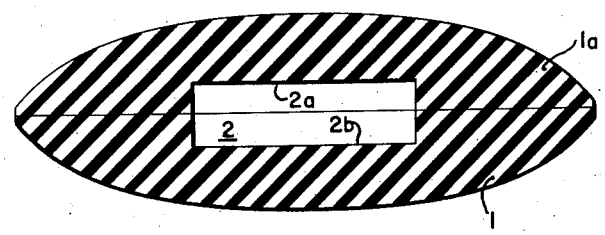
Fig. 2.
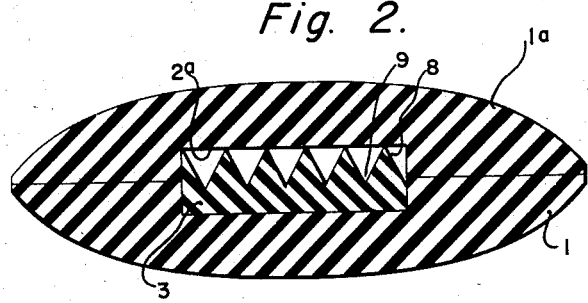
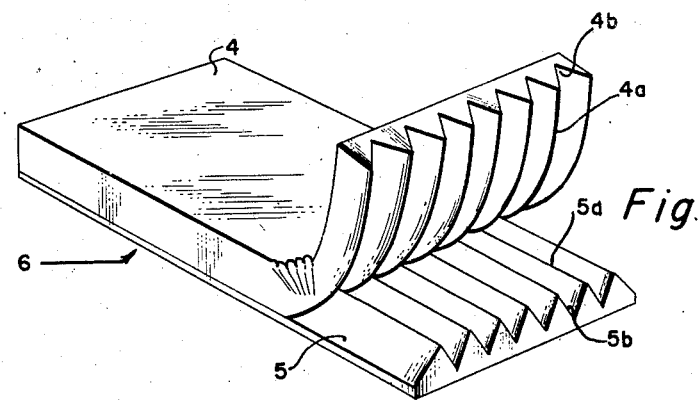
Fig. 3
Fig. 4.
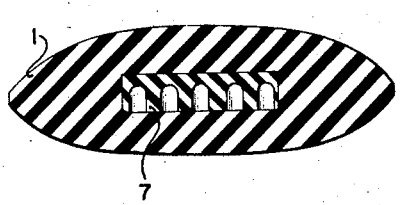
William T. Wagner,
INVENTOR.
BY.
Reuben Wolk
ATTORNEY.

United States Patent Office 2,898,975
Patented Aug. 11, 1959

2,898,975

CUSHIONING CONSTRUCTION

William T. Wagner, Dayton, Ohio, assignor to The Dayton Rubber Company, Dayton, Ohio, a corporation of Ohio Application October 28, 1957, Serial No. 692,688

6 Claims. (Cl. 155—179)

This invention relates to cushioning members, and more particularly to such members formed of cellular resilient elastomeric materials such as foam rubber, polyurethane foam, and the like.

Cushioning members, such as mattresses, pillows, furniture cushions, and the like, are commonly made of cellular resilient elastomeric materials by molding, or otherwise, into articles of the desired size and shape. In the case of foam rubber pillows and cushions, for example, these are generally molded in two matching sections with core openings extending inwardly from one surface of each section. The sections are thereafter united by cementing to form a composite product in which the core openings are internally surrounded, with the final product presenting an unbroken outer surface. These core openings are provided in order to reduce the weight of the product, at the same time utilizing less material, and with the further purpose of controlling or modifying the cushioning characteristics of the product.

Materials of the type described are manufactured by introducing foamed compositions of the type desired into molds, and solidifying or curing these foamed materials while in the cellular state with the molds. In the case of foam rubber, the compound is introduced into the mold in the previously foamed state, or it may be foamed within the mold, as shown by the Talalay Patent 2,432,353 or 2,671,931. In the case of polyurethane foams, the reactive mixture is introduced into the mold with a catalyst and foaming occurs through reaction of water with unreacted isocyanate groups in the mixture while the polymerization reaction is completed. In general, products of the type described are obtained from cellular elastomeric materials including foam rubber, sponge rubber, cellular polyvinyl chloride, foamed polyurethane resins, and other materials exhibiting elastomeric properties.

One of the problems which exists in the manufacture of molded cushioning materials is the fact that there is a certain amount of spoilage during manufacture which results in tearing or other damage to the product. Such damaged products may be repaired or patched and sold as seconds, or if the damage is too great for repair they are frequently sold as scrap to be ground up for use as fillers for toys or the like.

In accordance with the present invention, applicant has discovered a novel cushioning construction in which smaller blocks or segments of cellular material may be incorporated as a component of a molded product thus permitting the utilization of larger scrap pieces, while at the same time contributing to the structural characteristics of the final product. Thus it has been found that utilization of these smaller segments in the manner described below will produce a cushion or pillow having a desirable degree of firmness, yet being suitably soft to the feel or touch.

The invention may be further described by reference to the accompanying drawings and the description thereof, in which:

Figure 1 is a view in vertical transverse cross-section of the construction of the invention in an intermediate stage of manufacture;

Fig. 2 is a vertical transverse cross-section of one form of product of the invention;

Fig. 3 is a view in elevation illustrating one manner of forming an element of the construction described herein;

Fig. 4 is a view in vertical transverse cross-section of a modified form of the invention.

As shown in Fig. 1 of the drawings, a foam rubber pillow or cushion having a contoured shape is formed from two half segments 1 and 1a, which may be identical and molded in the same mold, or they may be of different size and configuration. As illustrated, each of these segments is molded with corresponding recesses 2a and 2b, respectively, so that when they are superimposed in the manner illustrated in Fig. 1, these recesses will form a hollow cavity 2 within the cushion. In the manufacture of the product these half segments are assembled with a filler positioned in the cavity, which filler may be formed from scrap or waste material or from material which has been preformed to provide a suitably shaped insert which will fit within said cavity. As shown in Fig. 2, for example, the insert for the cavity is a preformed corrugated member 3 having corrugations formed in one or both surfaces thereof, as illustrated, for example, by crests 8 and valleys 9 of the corrugations. These corrugations preferably extend longitudinally of the cushion but may be formed to extend transversely or diagonally, as may be desired. As illustrated in Fig. 3, the segment to be inserted within the cavity is formed from a block 6 of cellular material similar to that of which the cushion itself is formed. This block is cut into two equal segments 4 and 5 by cutting longitudinally in such a manner that corrugations are formed in each segment having crests 4a and 5a and valleys 4b and 5b, respectively. Thus each block is cut into two segments each of which is substantially the same, and each segment may then be cut into individual elements of the proper size to fit within the cavity formed between the two halves of the cushion, such as shown in Fig. 2. During the assembly of the two halves the segment is inserted into the recess of one cavity, the second pillow or cushion half positioned thereover and the two halves cemented together. If desired, cement may also be applied to the surfaces of the internal segment, so that it will be anchored to the adjacent surfaces of the cavity. While the drawings show an angular configuration for the corrugations, these may be rounded or of any desired shape.

A modified form of the invention is illustrated in Fig. 4 in which the internal cavity is filled with a segment cut from a molded cored member of cellular material. This may be cut from a scrap segment of a mattress or other cored molded article, or may be deliberately formed for the purpose. If desired, the separate halves of the cushion may be molded with core openings extending toward the outer surface from the inner matching surfaces, in addition to the utilization of the internal segments positioned within the cavities.

I claim:

1. A cushioning member formed of cellular resilient elastomeric material, a cavity therein surrounded by the walls thereof, and a separate insert formed of the same type of material positioned within said cavity said insert being formed with a plurality of spaced recesses in at least one surface thereof.

2. A cushioning member formed of cellular resilient elastomeric material comprising a pair of matching segments, a cavity formed internally of the member and surrounded by said segments, and a separate insert formed of the same type of material positioned within said cavity said insert having a series of spaced openings formed in at least one surface thereof.

3. A cushioning member according to claim 2 wherein the insert is formed with a series of corrugations having crests and valleys, wherein said crests engage an inner surface of the cavity and wherein said valleys and said surface define longitudinal openings within said member.

4. A cushioning member according to claim 3 wherein said cavity and said insert are formed with a rectangular cross-section.

5. A cushioning member according to claim 2 wherein the insert comprises a plurality of spaced core openings which extend normal to an inner surface of said cavity.

6. A cushioning member according to claim 5 wherein the cavity and the insert are formed with a rectangular cross-section.

References Cited in the file of this patent

UNITED STATES PATENTS

| | | |
|---|---|---|
| 2,234,506 | Sistig | Mar. 11, 1941 |
| 2,588,823 | Glassman | Mar. 11, 1952 |
| 2,761,493 | Lenz | Sept. 4, 1956 |

FOREIGN PATENTS

| | | |
|---|---|---|
| 556,953 | France | Apr. 24, 1923 |
| 771,512 | France | July 30, 1934 |